United States Patent
Persson (10) Patent No.: US 7,811,450 B2
(45) Date of Patent: Oct. 12, 2010

(54) SWIRL CHAMBER WITH MOVABLE NON-RETURN VALVE AND AIR INJECTOR FOR PREVENTION OF SEDIMENTATION IN STORM WATER AND WASTE DRAINS

(76) Inventor: Anders Persson, Banjogatan 1, 421 46, Vastra Frolunda (SE)

( * ) Notice: Subject to any disclaimer, the term of this patent is extended or adjusted under 35 U.S.C. 154(b) by 1080 days.

(21) Appl. No.: 10/598,405

(22) PCT Filed: Mar. 14, 2005

(86) PCT No.: PCT/SE2005/000366

§ 371 (c)(1),
(2), (4) Date: Aug. 28, 2006

(87) PCT Pub. No.: WO2005/093179

PCT Pub. Date: Oct. 6, 2005

(65) Prior Publication Data

US 2007/0163940 A1 Jul. 19, 2007

(30) Foreign Application Priority Data

Mar. 15, 2004 (SE) .................................. 0400628

(51) Int. Cl.
*E03F 5/10* (2006.01)
*E03F 5/14* (2006.01)
(52) U.S. Cl. ............... 210/170.03; 210/136; 210/242.1; 210/242.2; 210/416.1; 137/578; 137/544; 137/592; 137/403; 137/808; 137/809; 137/810

(58) Field of Classification Search ................. 210/136, 210/170.03, 416.1, 242.1, 242.2; 137/578, 137/544, 592, 403, 808, 809, 810
See application file for complete search history.

(56) References Cited

U.S. PATENT DOCUMENTS

| | | | | |
|---|---|---|---|---|
| 4,206,783 A * | 6/1980 | Brombach | .................... | 137/810 |
| 4,451,366 A * | 5/1984 | Smisson | ..................... | 210/209 |
| 4,834,142 A * | 5/1989 | Johannessen | ............... | 137/813 |
| 4,983,294 A * | 1/1991 | Lamb | .......................... | 210/521 |
| 5,462,075 A * | 10/1995 | Persson | ......................... | 137/2 |
| 5,531,888 A * | 7/1996 | Geiger et al. | ............... | 210/162 |
| 5,698,099 A * | 12/1997 | Fagan et al. | .................. | 210/304 |
| 5,814,216 A * | 9/1998 | Filion | .......................... | 210/154 |
| 5,902,477 A * | 5/1999 | Vena | ........................... | 210/162 |
| 6,053,206 A * | 4/2000 | Johannesen | .................. | 137/810 |
| 6,187,178 B1 * | 2/2001 | Lecornu et al. | ............. | 210/108 |

* cited by examiner

*Primary Examiner*—Thomas M Lithgow
(74) *Attorney, Agent, or Firm*—Rolf Fasth; Fasth Law Offices (57) ABSTRACT

A device for preventing sedimentation by regulating the flow of waste water through drain draining-wells, with or without a pump. The device has of a swirl chamber with connected outlet pipe and provided with an air injector. The swirl chamber which is tapered, generates a vortex flow in which the air added by the air injector gives the sludge particles a certain amount of buoyancy, making it easier for them to accompany the water flow without being precipitated.

10 Claims, 10 Drawing Sheets

SWIRL CHAMBER WITH MOVABLE NON-RETURN VALVE AND AIR INJECTOR FOR PREVENTION OF SEDIMENTATION IN STORM WATER AND WASTE DRAINS

PRIOR APPLICATION

This application is a U.S. national phase application based on International Application No. PCT/SE 2005/000366, filed 14Mar. 2005, claiming priority from Swedish Patent Application No. 0400628-4, filed 15Mar. 2004.

BACKGROUND AND SUMMARY OF THE INVENTION

It is a well-known fact that when storm water and waste water are pumped, there are greater or lesser problems of sedimentation of sand and sludge, blocking of pumps because of elongated objects and accretion of grease in pumping stations for water and waste water drains. This often causes problems such as smelly drains, including hydrogen sulphide and lumps of grease, together with sediment in the base, which has to be removed by sludge pumping. The most common type of pipe union is a single free outlet down into the draining-well, meeting the surface of the water. Depending on the water quality, various types of problems such as bad smells, bacteria spread and general fouling of the installation can occur. The ways used to minimise this problem include the installation of damping screens or down pipes which reduce the problem to a certain extent when the water runs down from the inlet pipe to the surface of the water in the draining-well. There are also prefabricated draining-wells made of glass fibre reinforced plastics, concrete, stainless steel or other materials where the drain pipe is connected at a tangent. This union is frequently dammed, i.e. at some point when the draining-well is being filled, the connection is below the normal surface of the water in the pumping station. In draining-wells made of prefabricated concrete pipes, there is great difficulty in drilling openings in a tangential direction. In the cases where the incoming flow of water falls off so much that the surface of the water in the draining-well, which is normally higher than the inlet opening, falls below the inlet opening on certain occasions, operation problems occur due to sedimentation which causes blockages. There are various types of mechanical or electrical devices in existing draining-wells, intended to stir and thus reduce the problems of blockage due to sedimentation. One large disadvantage of these device, in addition to regular maintenance, is that they require extra energy input and/or maintenance due to blockage, which leads to high operation costs.

Problems frequently occur in another type of draining-well for sewer overflow (surface water drains), which are intended to receive a mixture of storm water and waste water from a combined sewer drain pipe system to a recipient and/or treatment plant. Operation problems can occur due to (poorly sealed) leaky dams or dams which have come loose, or other devices which have come loose and can thus block the pipes. One of the most frequent causes of blockage is accretions of rags, plastic bags etc. which catch on the edge of an inlet instead of passing through the outlet pipe and on to the recipient.

One endeavours to both gain control of, and to reduce the maximum water flow that will pass on out through the outlet pipe to a treatment plant etc. This is done by choosing a relationship between bypass flow to a watercourse and to the treatment plant. For example, one can choose a high overflow edge for a small outlet dimension. If there is a low waste water flow and a small dimension outlet pipe, one obtains minimal dilution which strongly increases the risk of blockage. In order to avoid problems of waste pipe blockage, one is frequently obliged to increase the dimension of this outlet, which could be an outlet pipe or a simple hole in the sludge shield, a so-called sharp-edged outlet, which is commonly found in all conventional types of installation. By increasing the dimension of the outlet, a greater volume of water is drained via the existing sharp-edged outlet (which can be most closely compared with outlet pipe 7 in the invention), which thus becomes unnecessarily large. This means that the treatment plant will be overloaded by storm water, which should really have run over bypass edge 4. When this occurs, purification of the waste water is impaired since the treatment plant is overloaded by waste water and contaminated storm water, which should really have passed through outlet 34, directly to a watercourse. It is obvious, from the above description, that all draining-wells of the conventional type constantly represent a compromise based on an estimated average value of the waste and storm water arriving at the hopper. As soon as deviations from this estimated water flow volume occur, the hopper does not function as intended. This means that complications including several of the following can occur, such as blockage, overloading of treatment plant, release of contaminated water to watercourses, flooding of cellars and bad smells.

BRIEF DESCRIPTION OF THE DRAWING

The invention is explained in detail by use of the attached figures, which show various implementations of the invention, intended for different sizes of draining-wells, with regard to the volume of the waste and storm water that passes.

FIGURES

POSITION DESIGNATIONS

1 Swirl chamber
2 Inlet for water to draining-well, pipe
3 Air injector on outlet pipe.
4 Overflow edge on extended sides (12) of swirl chamber (1)
5 Outgoing waste and storm water which flows through the space (20) across the sludge screen (12 and 19)
6 Outgoing waste and storm water which flows through the outlet pipe (33)
7 Outlet pipe from swirl chamber (1)
8 Swirl chamber roof
9 Air injector on swirl chamber (1)
10 Draining-well
11 Swirl chamber water level
12 Swirl chamber extended sides.
13 Swirl chamber base
14 Space in a non-extended swirl chamber
15 Movable barrier
16 Sludge screen sealed roof
17 Sludge screen seal moulding
18 Water level in draining-well
19 Sludge screen located above the overflow edge (19) and higher than it.
20 Space between extended swirl chamber (1 and 12) and sludge screen (19)
21 Top edge of sludge screen
22 Draining-well, large, with one or more pumps
23 Pump
24 Draining-well base in a large draining-well (22)
25 Swirl separator on base of larger draining-well (22)
26 Rear section with fixings.
27 Seal for rear section against draining-well wall or inside of incoming pipe (2)
28 Fixing device, clamp for outlet pipe (27) from swirl chamber
29 Opening in rear section of swirl chamber
30 Air pipe to air injector on swirl chamber outlet pipe (7)
31 Air pipe to air injector on roof of swirl chamber (8)
32 Filter fixed to underside of the movable barrier (15)
33 Outlet pipe from draining-well 10 direct or via a pump 23 to sewage treatment plant etc.
34 Outlet of bypass water which the flow capacity of outlet 33 can not manage.
35 Space formed between the adjacent sides of the sludge screen (19) or against the filter (15) mounted on the barrier.

DETAILED DESCRIPTION

Figure 6:
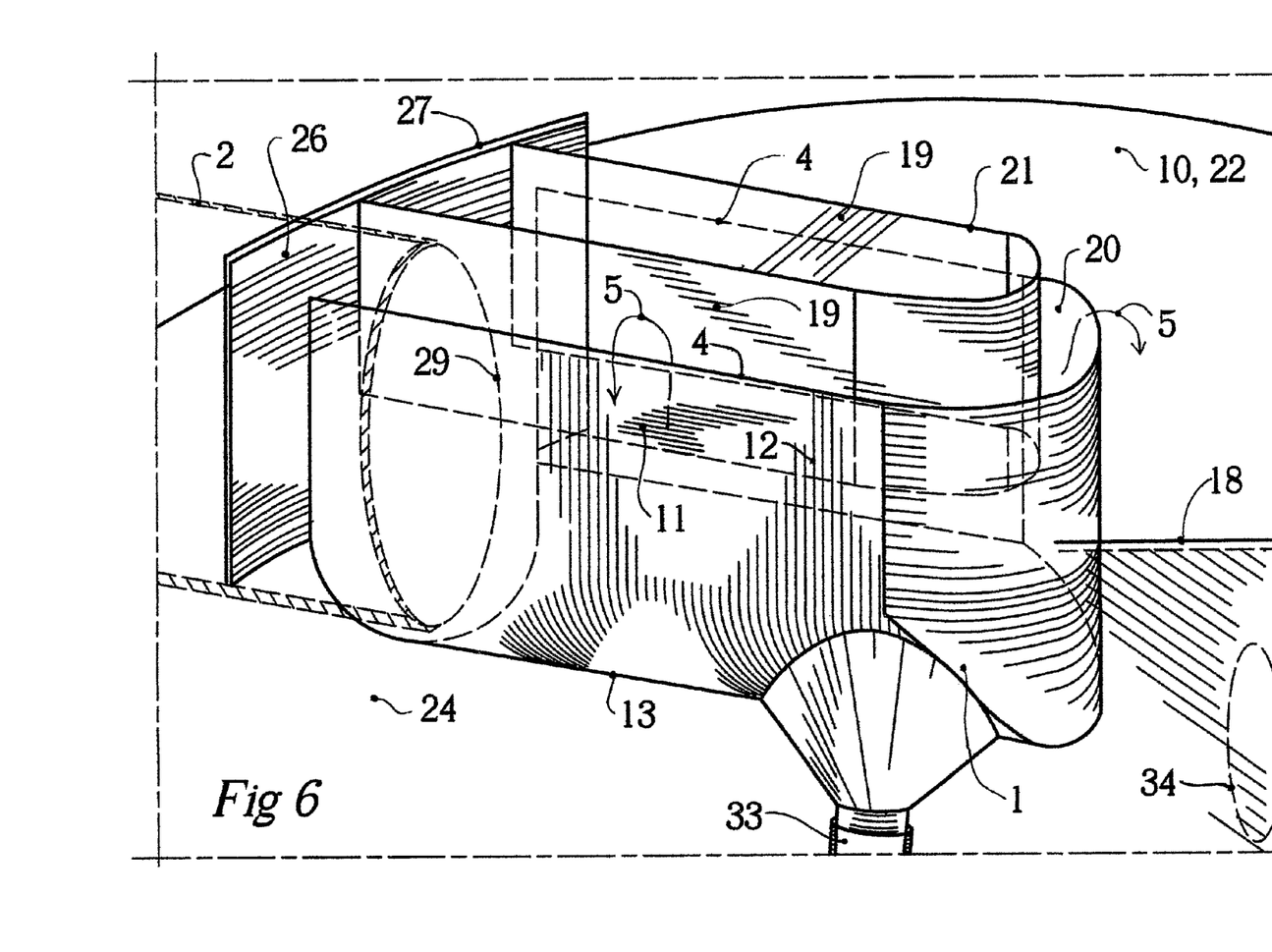
FIG. 6 Swirl chamber, extended, with fixed sludge screen (19) shown obliquely from above and in front.
Figure 7:
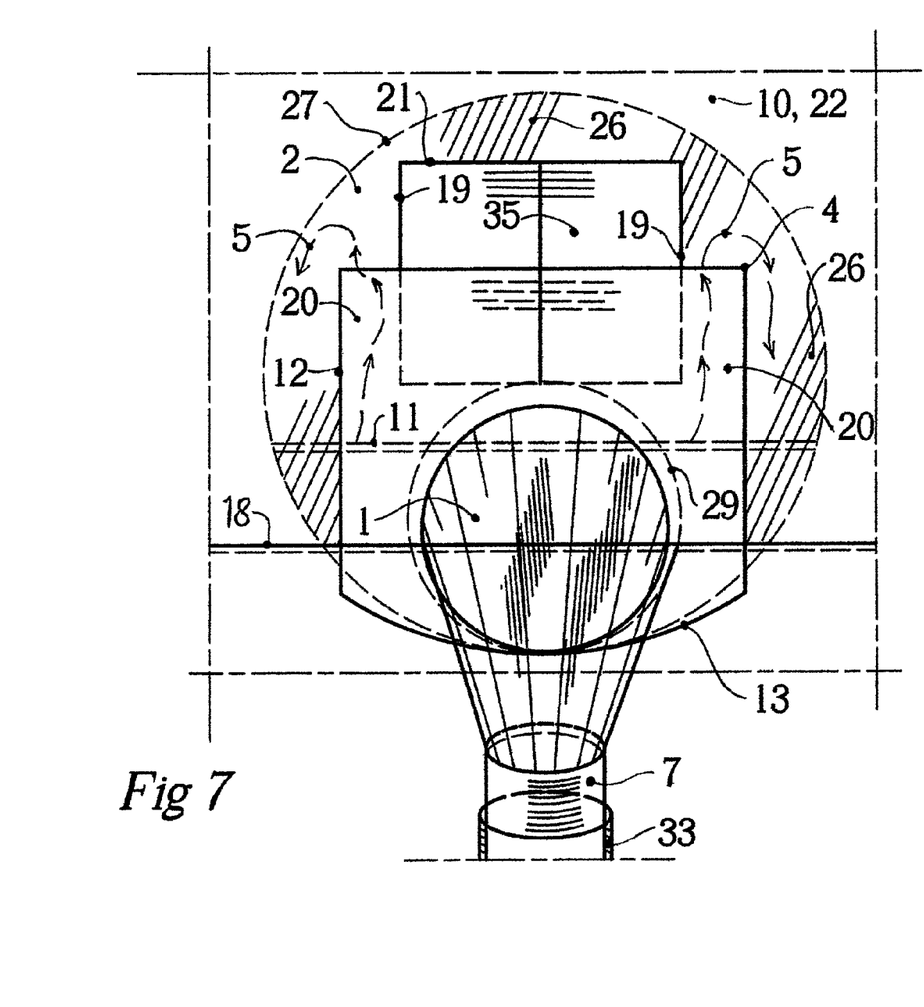
FIG. 7 Swirl chamber, extended, with fixed sludge screen (19) shown obliquely from straight in front FIG. 8 Swirl chamber, extended, with fixed sludge screen (19) shown obliquely from above and in front, with bypass and air injector FIG. 9 Swirl chamber, extended, with movable barrier (15), filter (32) and with an installation and sealing flange (27) shown from straight in front.
Figure 8:
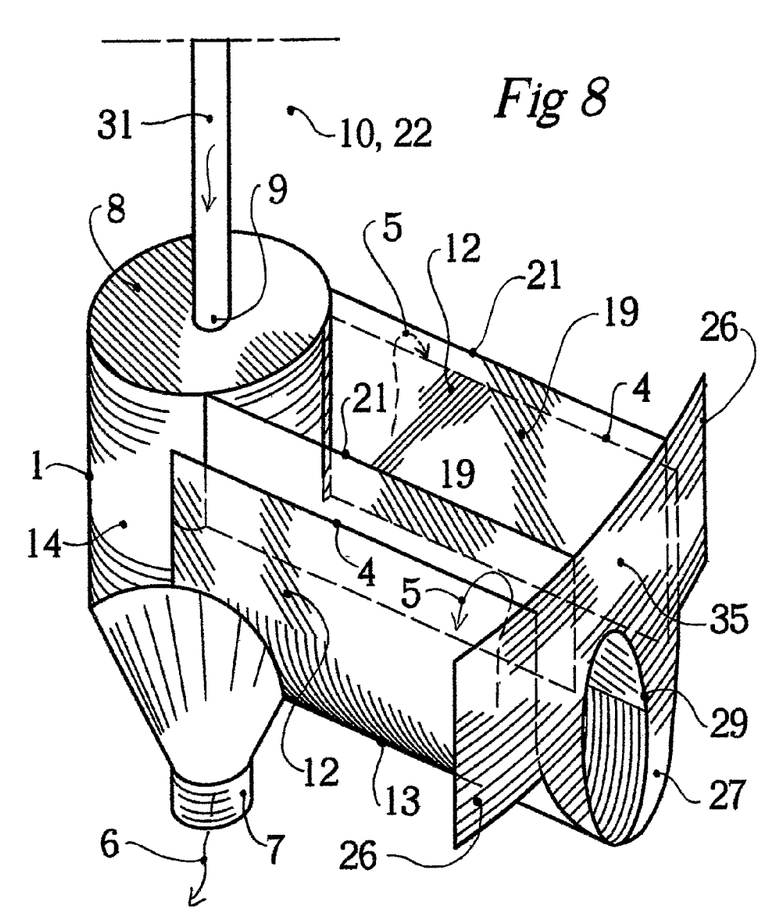

This invention solves the problems described by means of a swirl chamber 1, directly installed over the incoming inlet pipe 2 in a draining-well 10 or 22, and intended to create and regulate a swirling flow, together with an air injector 3 which is connected to the outlet pipe 7 connected to the swirl chamber 1, whereby the air supplied via pipe 31 gives the smaller sludge particles increased buoyancy so that they can easier remain in suspension and thus follow with the water flow instead of being precipitated. An essential component is that the swirl chamber 1 can be integrated with a sludge separation unit which very roughly separates strongly sludge bearing water from water with lower sludge content. The sludge bearing water can then be directed to a waste treatment plant and the water with less sludge can be directed straight out to a water course or other recipient. This separation component can be implemented by giving the swirl chamber extended sides 12 or another sludge screen 19 which is located inside the sides 12 and is higher than them, without extending down to the base of the swirl chamber 13, which also extends under the entire extended section formed by the sides 12. A space 14 is formed between the extended sides 12 and the sludge (steel) screen 19 inside them, which allows water to pass under the sludge screen 19 and up into spaces 14 and 20, after which the water can run over the extended sides 12 and down into the draining-well 10 or 22, after which the water with lower sludge content can run out into a watercourse etc. The space 14 is sealed against the swirl chamber 1, whereas space 35 inside the two sides of the sludge screen 19, FIGS. 6 and 8, is open to the swirl chamber 1. This means that the water that comes in through the inlet 2 can flow straight into swirl chamber 1 through space 35 but depending on the volume provided in space 35, the flow rate in this area can be controlled to a certain extent, i.e. the larger the volume of space 35 is, the slower is the flow rate, and conversely, the smaller the volume of space 35 is, the faster the water flows. A larger or smaller degree of surface sludge separation can be achieved, depending on the flow rate of the water. By providing the invention with a movable barrier 15, overflows due to back-flow of water can be prevented in cellar areas etc.

Figure 1:
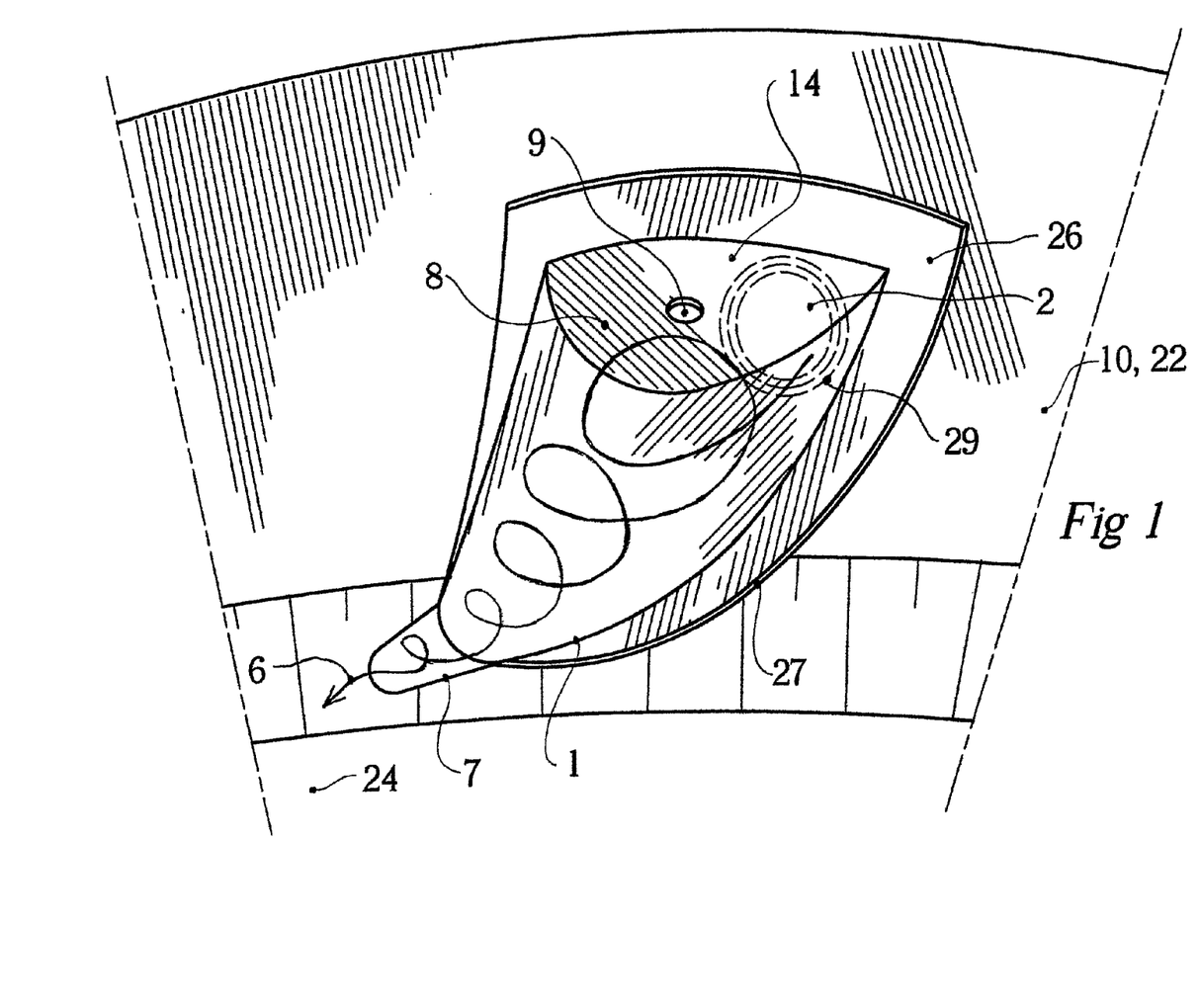
FIG. 1 Swirl chamber installed on the inner wall of the draining-well, shown obliquely from above.
Figures 2, 3:
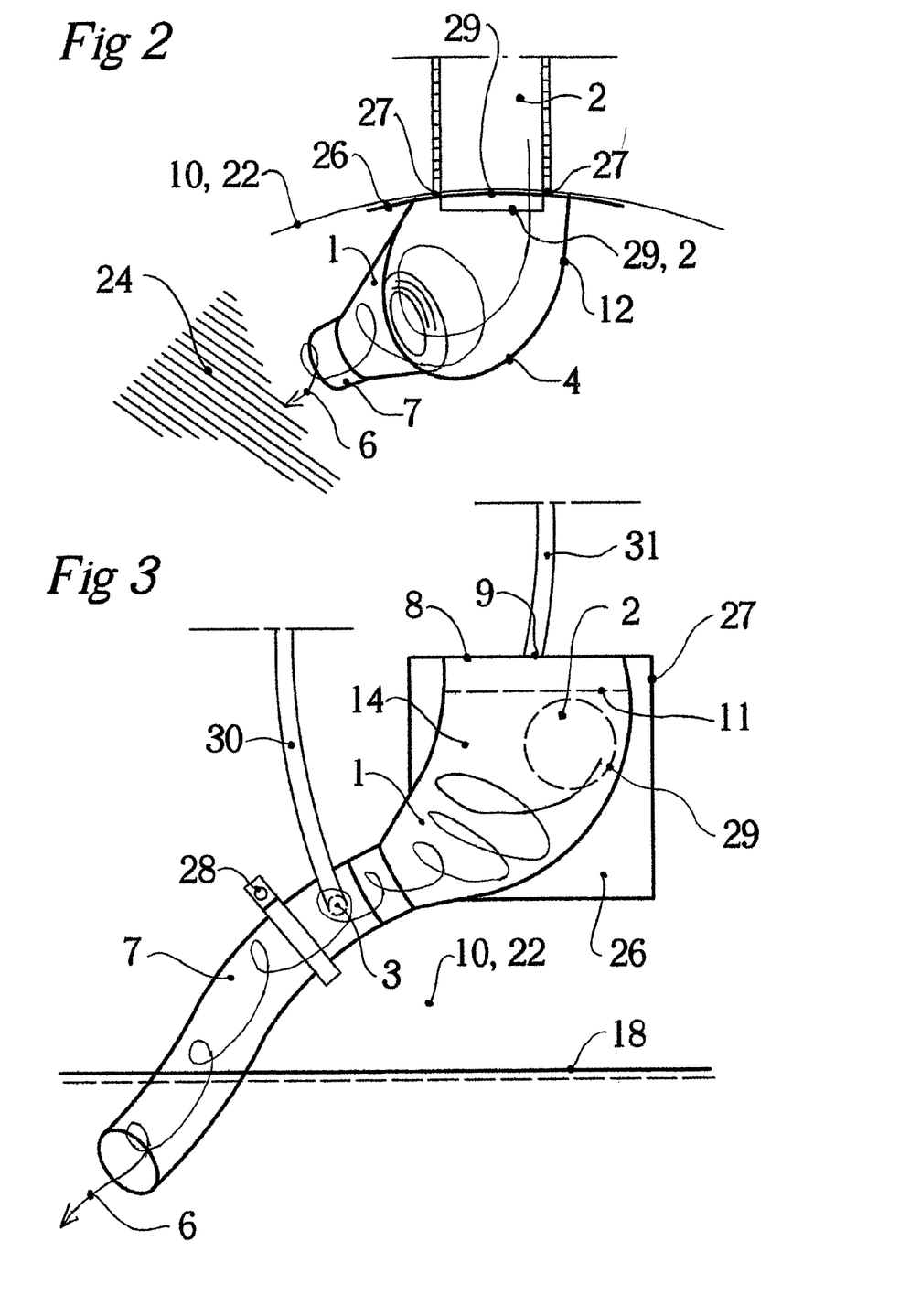
FIG. 2 Swirl chamber shown from above
FIG. 3 Swirl chamber shown from straight ahead.
Figure 4:
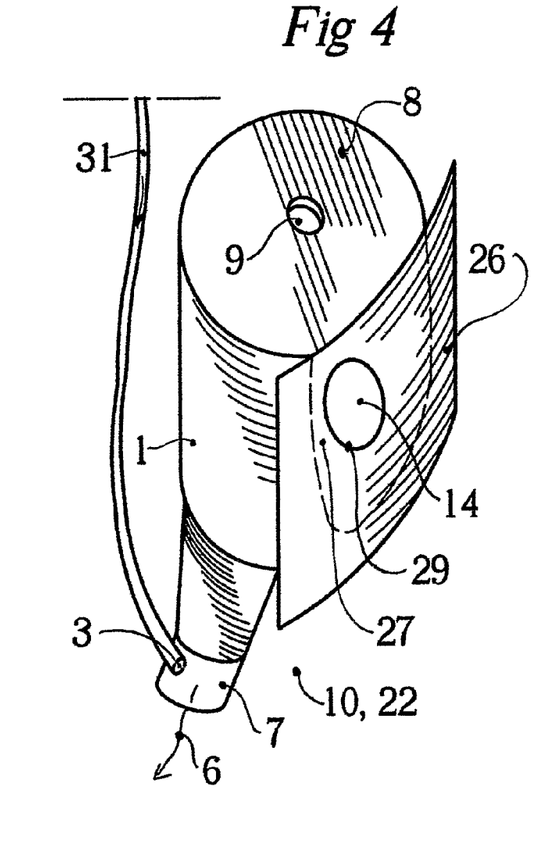
FIG. 4 Swirl chamber shown obliquely from above

The invention can be designed in many ways such as FIGS. 4 and 8, but always with an almost tapered section, which comprises the actual swirl chamber 1 where the more or less linear flow of the water is forced to assume a rotating movement and on occasions when more than one flow occur, all outlet pipes 7 for them are installed in a manner such as to force the water at the bottom of draining-well 22 to rotate. Depending on the space in draining-well 10 or 22, and the expected water flow, the swirl chamber 1 can be designed in many different ways, where the surfaces surrounding the swirl chamber can be straight, curved or angled as in FIGS. 1, 2, 3, 6, 7, 9, 10, 11, 12 and 13. In some types of draining-wells 10 or 22, where there can be one or several swirl chambers 1 with outlet pipes 7, and where there is no need of a pump or several pumps 23 to force the outgoing waste and storm water on further, one or several outlet pipes 7 can be directly joined together to outlet pipe 33 for onward transport.

In some cases, for example water flows which are more or less constant and where the inlet pipe 2 has a connection below the water level in draining-well 10 or 22, the water that flows through swirl chamber 1 can be aerated by arranging a roof 8 over the swirl chamber, provided with air injector 9, FIGS. 1, 3, 4, 5 and 8, located where the vortex formed in the swirl chamber has its centre, which in turn depends on how the swirl chamber is designed. By arranging the air injector 9 more or less in the centre of the water vortex, this gives enough air injected via pipe 31, thanks to the reduced pressure, to increase the buoyancy of the smaller particles so that they can be carried along with the water flow containing waste and storm water 6.

Thanks to its relatively compact design, the invention can easily be installed over or adjacent to inlet pipes 2 entering existing draining-wells 10 or 22, FIGS. 1, 5, 6, 7, 9, 12 and 13 or when draining-wells are prefabricated, they can be directly integrated with their inlet ducts 2. Large cost savings can be achieved thanks to this simple method of assembly. A rear section 26, provided with a seal 27, can be bent or angled, depending on the area available inside the draining-well, is fixed to the wall of the draining-well 10 or 22 or over an inlet 2, or if the inlet 2 is much larger, is inserted into the pipe by means of a round shield of the same diameter as the inlet pipe inner diameter and fixed there in a suitable manner. The position of the swirl chamber 1 in height, in relation to the normal water level 18 in the draining-well is not critical, even if the efficiency increases as the height of the inlet is increased, especially for temporary or permanent low flow rates.

The invention lowers the water level 11 and reduces the number of sediment particles suspended in the surface water, which accompany the water that runs over the overflow edge 4 in the permissible flow of waste and storm water, which under applicable rules/or permits is allowed to flow out through the swirl chamber 1 on occasions when the swirl chamber 1 is not covered by means of a roof 8, and is open instead. Swirl chamber can be either fixed directly to the wall of the draining-well 10 and/or to a pipe and can be provided with extended sides 12 and base 13, FIGS. 6, 7, 8, 9, 10 and 13. The extended sides 12 then serve to provide an extended overflow edge 4, which on occasions when water flow is extra strong for any reason, permit extra overflow so as to keep the water level 11 down in the sludge separator. This overflow edge 4 can be made longer or shorter, depending on the expected water flow. If the water flow is large, an extended overflow edge 4 gives a smaller raise in water level 11 in relation to overflow edge 4, which prevents larger contamination such as bunches of plastic bags, rags, paper etc. from following the water flow over the overflow edge 4, so that they accompany the outgoing waste and storm water 6 instead.

The invention makes it possible to predetermine to a large extent the flow rate in the outgoing pipe 7, due to its function and due to the movable barrier 15. This is something that is very difficult to achieve at present, with conventional types of devices. The outgoing pipe 7 determines the water flow rate by means of its dimension, which its turn is decisive for the efficiency of sludge transport to the treatment works etc. should be. The dimension of the outgoing waste pipe 7, together with the height of the overflow edge 4, gives an adjustable flow through outlet 7. Completely independently of the relationship between the dimension of outlet pipe 7 and the height of overflow edge 4, barrier 15 has the function that it prevents the water that could flow backwards in through outlet 34 due to rain, melting snow etc., and thus cause overflowing in cellars of buildings, street drains etc, which is now prevented by barrier 15, since it does not permit water to flow out backwards through inlet duct 2. In general, it can be said that a large dimension in outlet pipe 7 reduces the risk of blockage and then, together with a lower height of overflow edge 4, contributes to lower flow rate in output pipe 7. A low overflow height 4 in conventional draining-well types often causes overflow of bunches, paper, flocked sludge etc. Since the invention has movable barrier 15 with filter 32, these problems are eliminated. By estimating the water flow in the known manner and by considering the function of the invention, a suitable value for the dimension of outlet pipe 7 can be calculated.

Figure 9:
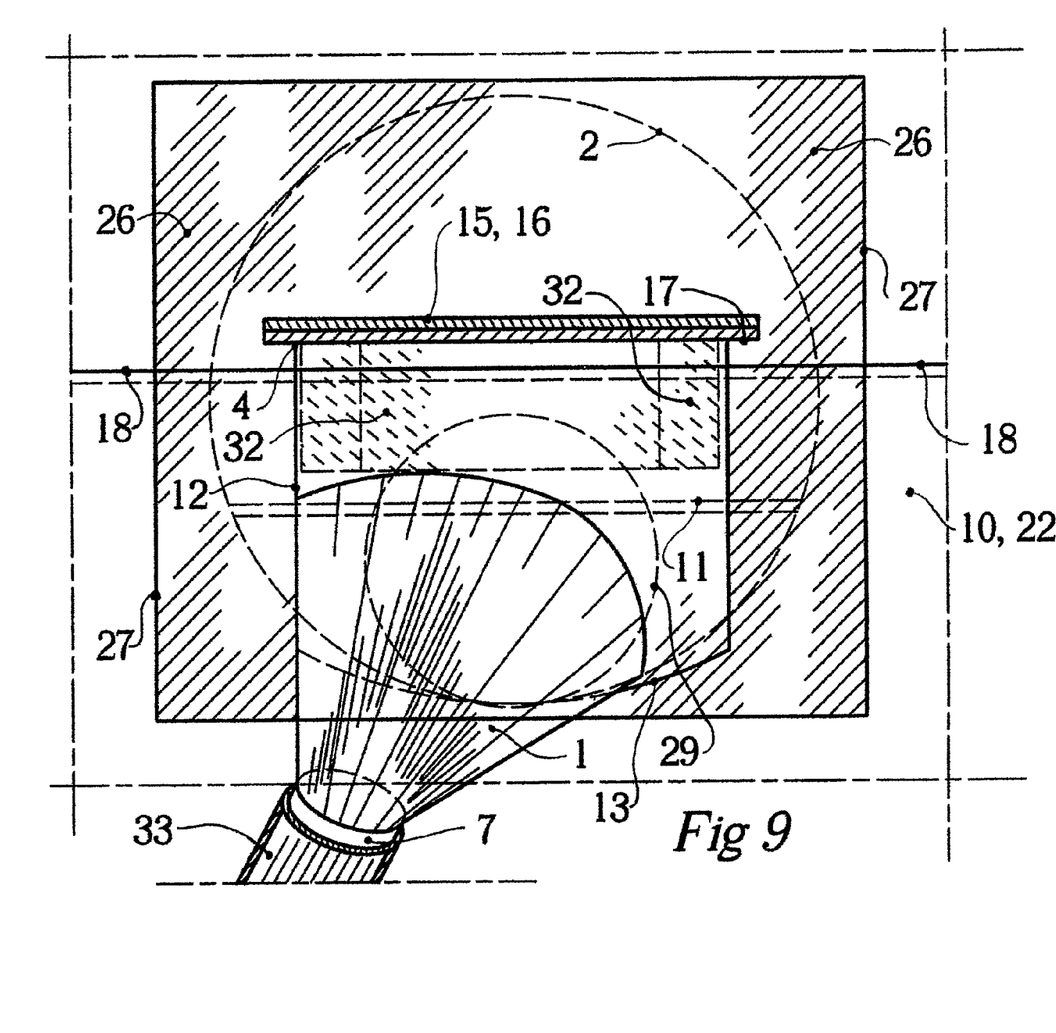
Figures 10, 11, 12:
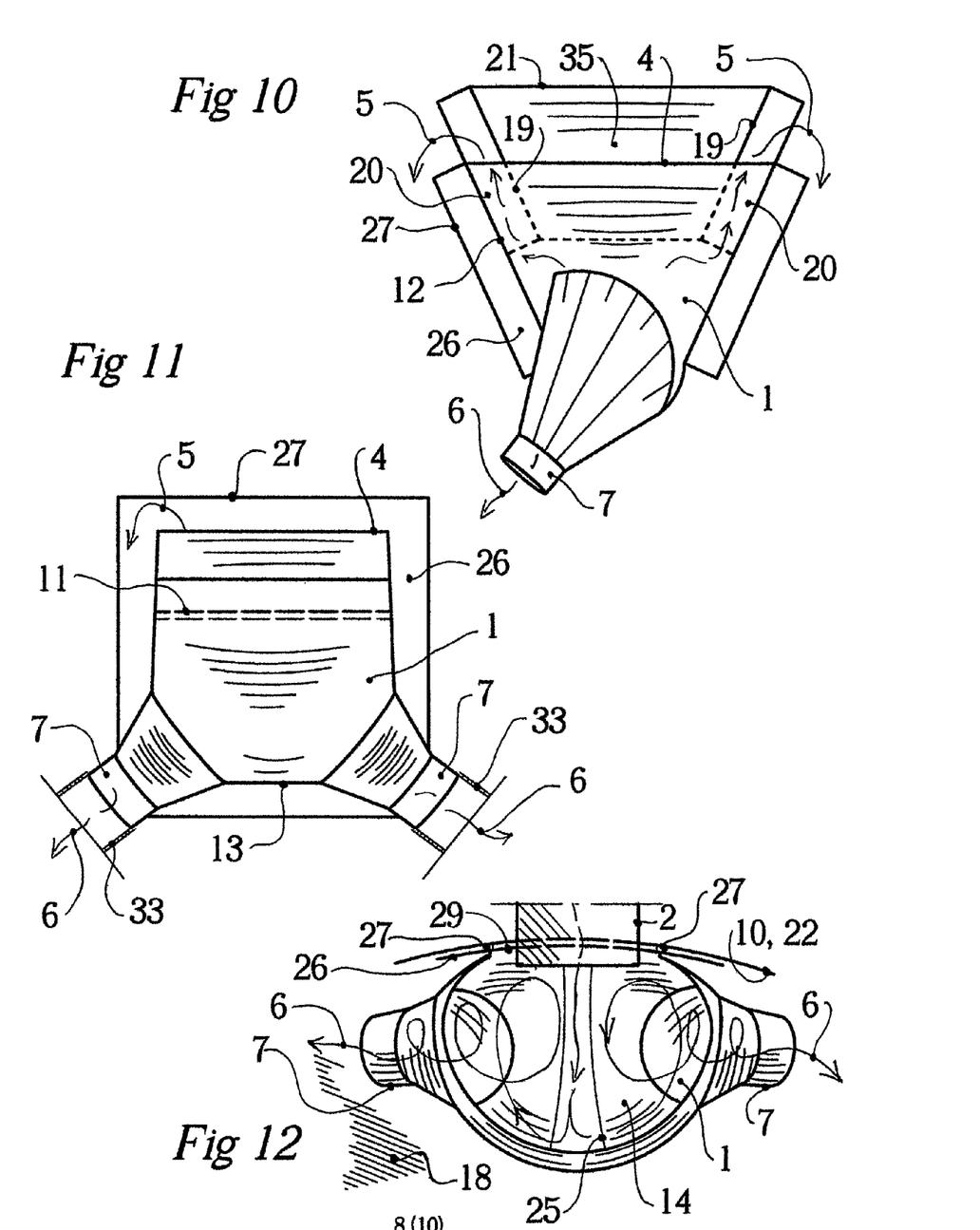
FIG. 10 Swirl chamber, extended, with fixed barrier (19), shown from straight in front.
FIG. 11 Swirl chamber with outlet (7), shown from straight in front
FIG. 12 Swirl chamber with outlet (7), installation and sealing flange (27) and swirl separator (25) shown from above.
Figure 13:
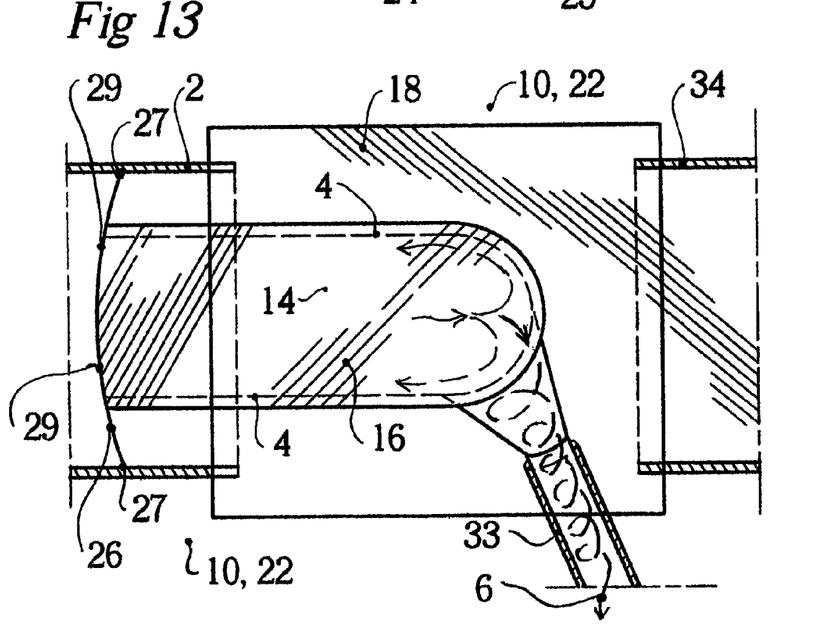
FIG. 13 Swirl chamber, extended, with installation and sealing flange (27), with movable barrier (15), sludge barrier roof (16) shown from above.
Figure 16:
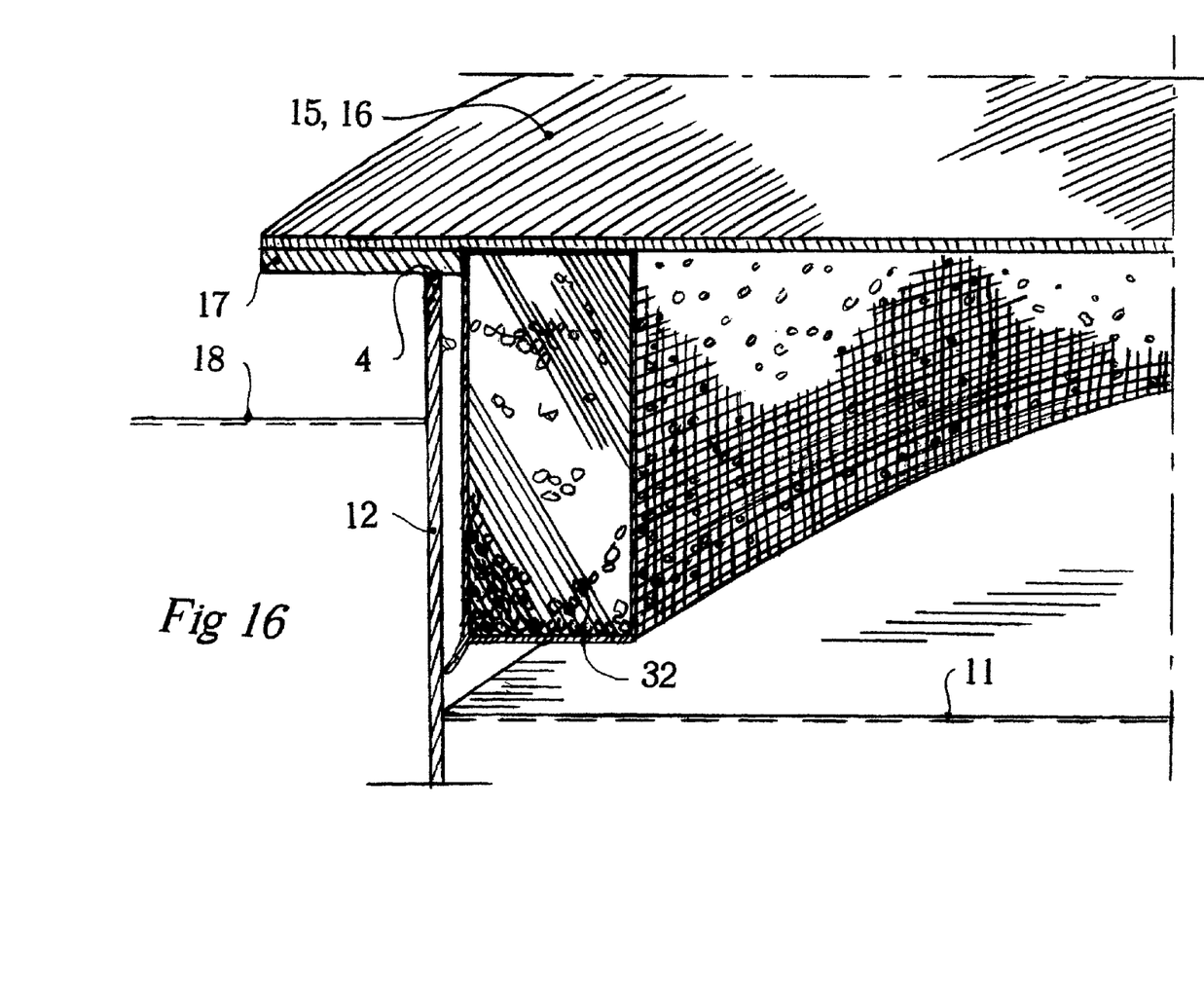
FIG. 16 Movable barrier with filter, shown from the side.

In some cases, it can be suitable to install a movable barrier 15, FIGS. 9 and 13 on top of the swirl chamber1, irrespective of whether the swirl chamber has been extended by sides 12 or not. This movable barrier 15, FIG. 16, could have a float which makes barrier 15 follow the water level or it can be controlled in other ways, such as being lifted by the pressure of the water flowing from underneath. The movable barrier 15 can be provided with a coarse filter 32, consisting of filter grains, which can be made from plastics, ceramic, metal mesh or other suitable material whose size and shape are suited to the sludge and/or contamination to be separated. Filter 32 should preferably be designed so that filter 32 which is fixed to movable barrier 15 is designed as a body that easily enters swirl chamber 1 with or without extension by means of sides 12. Filter 32 can completely cover barrier 15, apart from the section that should be in contact with the upper edge of the swirl chamber. Movable barrier 15 sinks down when the water flow in through inlet pipe 2 is small and seals against the top edge of swirl chamber 1, thus forming a barrier to reverse flowing water, which is prevented from entering, and instead leaves via outlet pipe 7 and swirl chamber 1 downstream into the sewers and drain pipes. This reverse flow water can occur when the overflow water that runs over overflow edge 4 via outlet pipe 34 exits to a watercourse, which can have large variations in water level for various reasons. When the level of this watercourse is considerably higher than normal, the water would flow backwards via outlet pipe 34 into draining-well 10 and on into swirl chamber 1 if it did not have a roof 8 or a movable barrier 15. This would result in overflowing in cellars etc In some cases, where outlet pipe 7 from the swirl chamber is directly connected to outlet pipe 33, which goes to a treatment works or other recipient, it can also be desirable to reduce the flow through outlet pipe 7 so as to avoid getting excessive volumes of diluted waste water in the treatment plant, and thus restrict the volume of water as far as possible, so that it is maintained within the maximum water volume allowed by regulations and/or permit. This is achieved by calculating the dimensions in outlet pipe 7, opening 29 in rear section 26 and the height of the sides of swirl chamber 1 or possible extended sides 12 in relation to the length of the overflow sides 4 of swirl chamber 1, by means of the estimated maximum flow of waste and storm water. Given normal water flows, movable barrier 15 should be so much smaller that the water can flow freely without resistance between barrier 15 in the extra area 14 formed or 35 through the filter 32 installed on the movable barrier 15 in swirl chamber 1. Movable barrier 15 has a sealed roof 16 and a seal moulding 17 which, when movable barrier 15 is not held up by the water entering the swirl chamber, it seals against overflow edge 4 of the extended sides 12 in swirl chamber 1. If the situation should occur, due to violent rain, that the water level 18 in draining-well 10 rises because water flows backwards into draining-well 10 from the stream, river or lake etc. and the water which normally runs over the overflow edge or gunwale 4 and out into these, and that the incoming flow through swirl chamber 1 does not exceed the maximum water volume allowed by regulations and/or permit to flow to the treatment works etc., the moving sludge separator sinks down and uses moulding 17 to seal against the extended sides 12 of the extended swirl chamber 1. The movable barrier 15 then serves as an efficient non-return valve, FIGS. 9, 13 and 16.

In some cases, where there is no risk of reverse flow, movable barrier 15 is not needed and sludge separator can then be permanently installed on rear section 26, FIGS. 6, 7, 8 and 10, an can be roofless 16. The space 20 between the extended swirl chamber 1 and sludge separator 19 can be designed so that the volume of water in normal variation does not rise above the top edge 21 of the fixed sludge separator 19. On occasions when the volume of water increases, the water rises inside sludge separator 19, FIGS. 6, 7, 8 and 10, and the flow out between the latter and the walls of the extended swirl chamber 1 increases at the same time as the raised water level increases the pressure on the outlet in the base 13 and the outflow through outlet pipe 7 increases. By this means, a self-regulating relationship is obtained between the volume of water which is permitted to go to the treatment plant etc. and the volume of water that bypasses the treatment plant.

Figure 5:
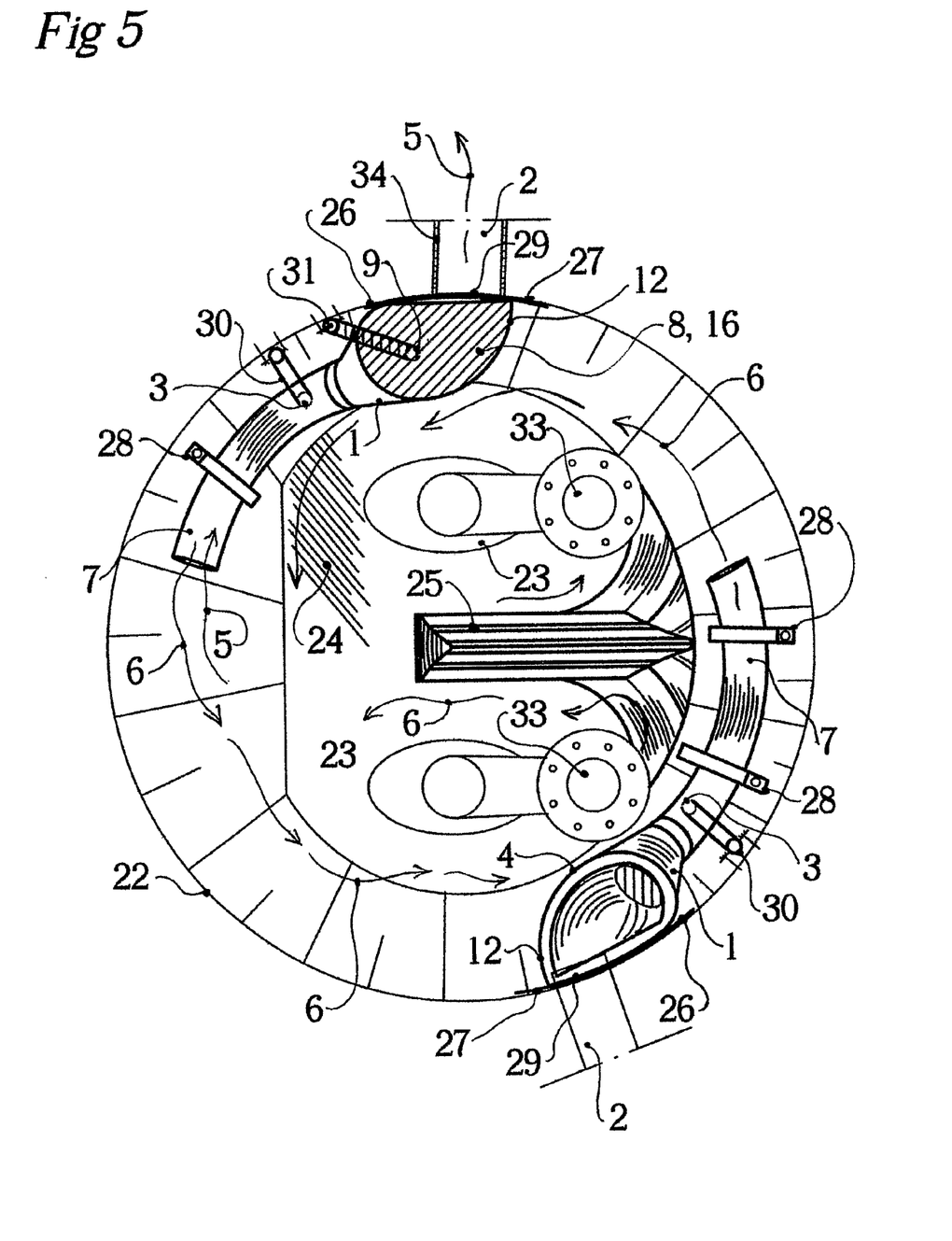
FIG. 5 Draining-well with units installed, shown from above
Figures 14, 15:
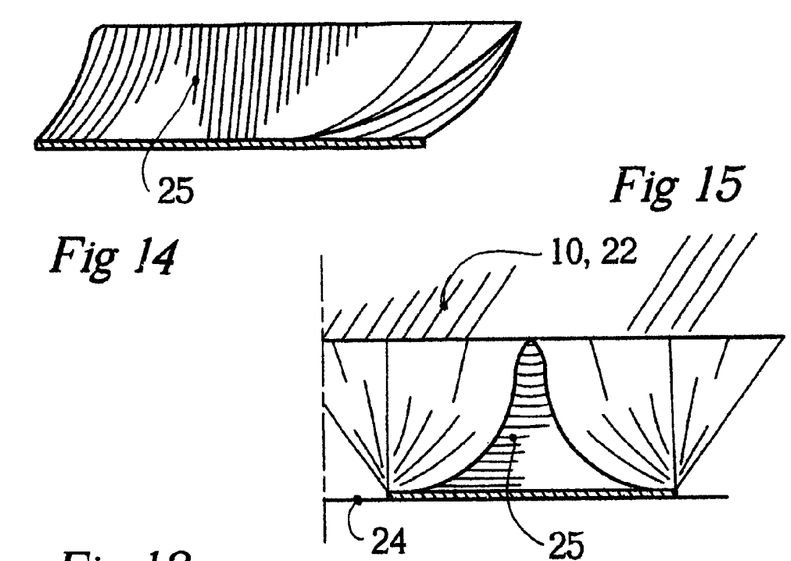
FIG. 14 Swirl separator, in base of draining-well area, shown from the side.
FIG. 15 Swirl separator, shown in section

In larger draining-wells 22, where a pump 23 can sometimes be installed, FIG. 5, and where there can be more than one inlet pipe, and where the volume of incoming water can vary very considerably between the incoming flow rates, the base area 24 of the draining-well becomes so large that the incoming water, which has passed one or more swirl chambers 1, especially at low flow rates, has such low kinetic energy that the sludge particles accompanying the water are unable to maintain themselves in suspension, which means that there is a major risk of sludge formation. This sedimentation can be prevented by providing the draining-well with a swirl separator 25 on the base 24 of the draining-well, FIGS. 5, 14 and 15, which reduce the area around a pump 23, which is adjacent to one or several of the flows that enter via the swirl chambers 1, which allows a faster movement of water to be maintained due to the reduced areas, which can considerably reduce any sedimentation. On the occasions when large volumes of water, due to rain or other causes, flow through one or more swirl chambers 1 down to the base of the draining-well 24, the swirl separator(s) 25 installed on the base of the draining-well 24 cause the formation of vortices adjacent to each pump 23, so strong that any sedimentation is flushed up again and accompanies the outgoing waste and storm water 6 out through outlet pipe 33.

While the present invention has been described in accordance with preferred compositions and embodiments, it is to be understood that certain, substitutions and alterations may be made thereto without departing from the spirit and scope of the following claims.

The invention claimed is:

1. A device which is retrofitted or prefabricated for a draining-well, comprising:
   the draining well having an inlet defined therein, and
   one or several pumps, operatively connected to a first outlet pipe for carrying waste and storm water,
   a swirl chamber having an air injector in operative engagement with a second outlet pipe,
   a movable barrier, in operative engagement with the second outlet pipe to prevent a reverse flow from a recipient watercourse from entering a third outlet pipe and coming back up through the inlet,
   a swirl separator in operative engagement with the draining well which forms vortices, and
   the first outlet pipe in fluid communication with the swirl chamber.

2. A device according to claim 1 wherein a rear section (26) is provided with a fixing device, which is inserted into an inlet (2) for incoming water, where the edges of the rear section (26) are provided with a seal (27) against the inside of the inlet (2).

3. A device according to claim 1 wherein a seal covers the inlet.

4. A device according to claim 3 wherein the swirl chamber is provided with extended sides and extended base, which offers a lower overflow height and less risk of surface sludge particles passing the overflow edge.

5. A device according to claim 4 wherein an extra sludge shield (19) is higher than the sides (12) that does not extend all the way down to the base of the swirl chamber (13), which permits water to flow up under it through the space (20) and then over the edge to the extended sides (12) of the swirl chamber (1), so that the surface sludge remains inside the sludge shield (19) and is transported to the vortex forming outlet (7) of the swirl chamber, where it is sucked down and is taken along with the outflowing waste and storm water (6) through the outlet pipe (33).

6. A device according to claim 5 wherein the movable barrier has a coarse filter fixed underneath the movable barrier.

7. A device according to claim 5 wherein a coarse filter (32) is installed in the space (20) between the extended sides (12) and the sludge shield (19).

8. A device according to claim 5 wherein the height of the sludge shield (19) above the overflow edge (9) of the extended sides (12), so that when water flows are greater than the estimated nominal water flow (5), this larger amount of water then flows via space (35) over the top edge of the sludge shield (19) to the outlet (34).

9. A device according to claim 1 wherein the inlet pipe of the device is connected to an upstream delaying and smoothing water reservoir, a rear section has an opening whose area is less than the area of the inlet pipe, which reduces the flow during flow peaks via a filter direct to the outlet.

10. A device according to claim 1 wherein a roof of the swirl chamber being removable for inspection or cleaning.

* * * * *